United States Patent [19]
Beaudout

[11] 3,871,108
[45] Mar. 18, 1975

[54] DIRECTIONAL DEVICE
[76] Inventor: Henri Beaudout, 11970 Langelier, Apt. 201, Montreal, Quebec, Canada
[22] Filed: Mar. 5, 1973
[21] Appl. No.: 338,038

Related U.S. Application Data
[63] Continuation-in-part of Ser. No. 133,314, April 12, 1971, abandoned.

[52] U.S. Cl. .................................. 33/349, 33/355 R
[51] Int. Cl. ............................................. G01c 17/04
[58] Field of Search .............. 33/272, 349, 355, 356

[56] References Cited
UNITED STATES PATENTS

| | | | |
|---|---|---|---|
| 918,709 | 4/1909 | Smith | 33/349 |
| 994,901 | 6/1911 | Barbow | 33/356 |
| 2,303,990 | 12/1942 | Dietz | 33/349 |

FOREIGN PATENTS OR APPLICATIONS

| | | | |
|---|---|---|---|
| 536,471 | 2/1922 | France | 33/349 |
| 101,226 | 10/1925 | Austria | 33/356 |
| 705,118 | 3/1954 | Great Britain | 33/349 |

Primary Examiner—Richard E. Aegerter
Assistant Examiner—Richard R. Stearns

[57] ABSTRACT

A directional device for overland travel to aid in returning to intersect a roadway, in which a pair of concentric rotatable dials and a freely rotatable compass needle are mounted on a frame. One dial carries a first reference indicium while the other dial is divided into a pair of individually identifiable semicircular arcs having a reference divider at one junction of the arcs. The dials are releasably fixable one with respect to the other and the one dial is releasably fixable with respect to the frame whereby the indicia are registrable with an indexing point on the frame.

12 Claims, 9 Drawing Figures

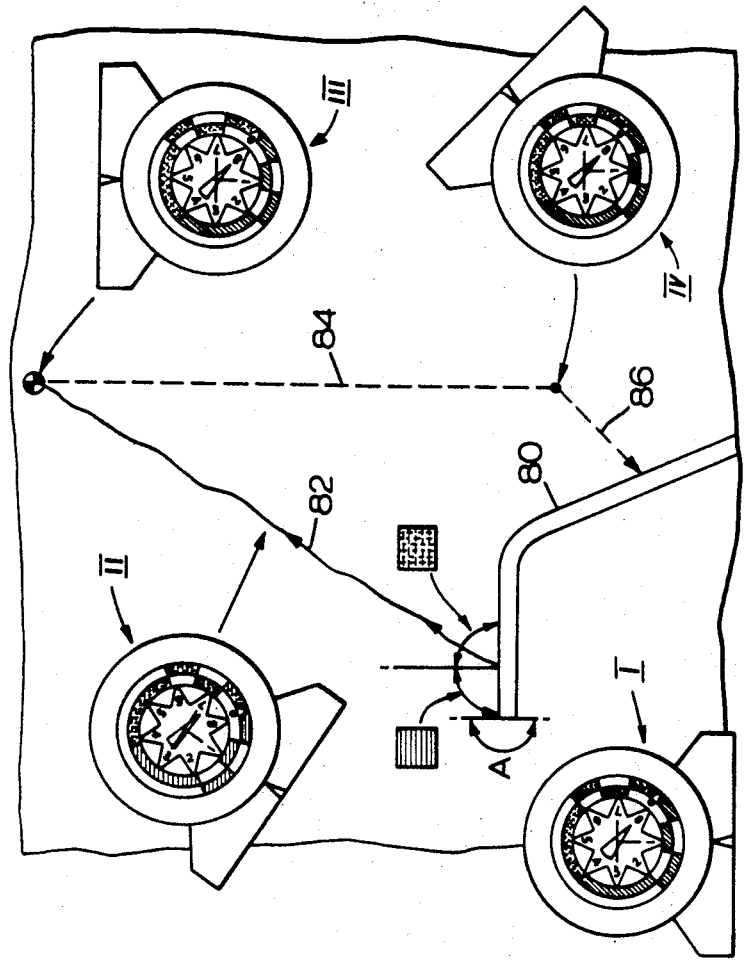

DIRECTIONAL DEVICE

This is a continuation-in-part of Application Ser. No. 133,314 now abandoned filed Apr. 12, 1971.

The present invention relates to a device employing a compass, and more particularly to a directional aid for over-land travel.

Many persons, such as hunters and hikers, leave their automobiles parked by the side of the road and strike off into forest or bush country. Because of the nature of the surroundings these persons find it difficult on their return journey to locate their starting point. If the automobile is parked on a continuous road then an ordinary compass, if followed accurately both on the outward and the return journey through the bush, will lead a person to come upon the road again but, unless by good fortune the person can see his vehicle, he will not know which way to turn along the road to reach the vehicle. If the vehicle has been parked at the dead end of a road, then the person might well miss the road completely on his return journey.

It is an object of the present invention to provide a directional device which, by following a series of steps in resetting the device during a journey, will assist a person to intersect the road from which the journey was started and may also indicate the subsequent direction of travel along the road to reach the specific starting point.

An example embodiment of the invention is shown in the accompanying drawings in which:

FIG. 1 is a plan view of a directional device;

FIG. 2 is a cross-sectional view taken along line 2—2 of FIG. 1;

FIG. 3 is a schematic diagram showing the use of the directional device of FIG. 1;

FIG. 4 is a diagram of the indicia marked on the pair of cylindrical dials of the device of FIG. 1;

Figure 5:
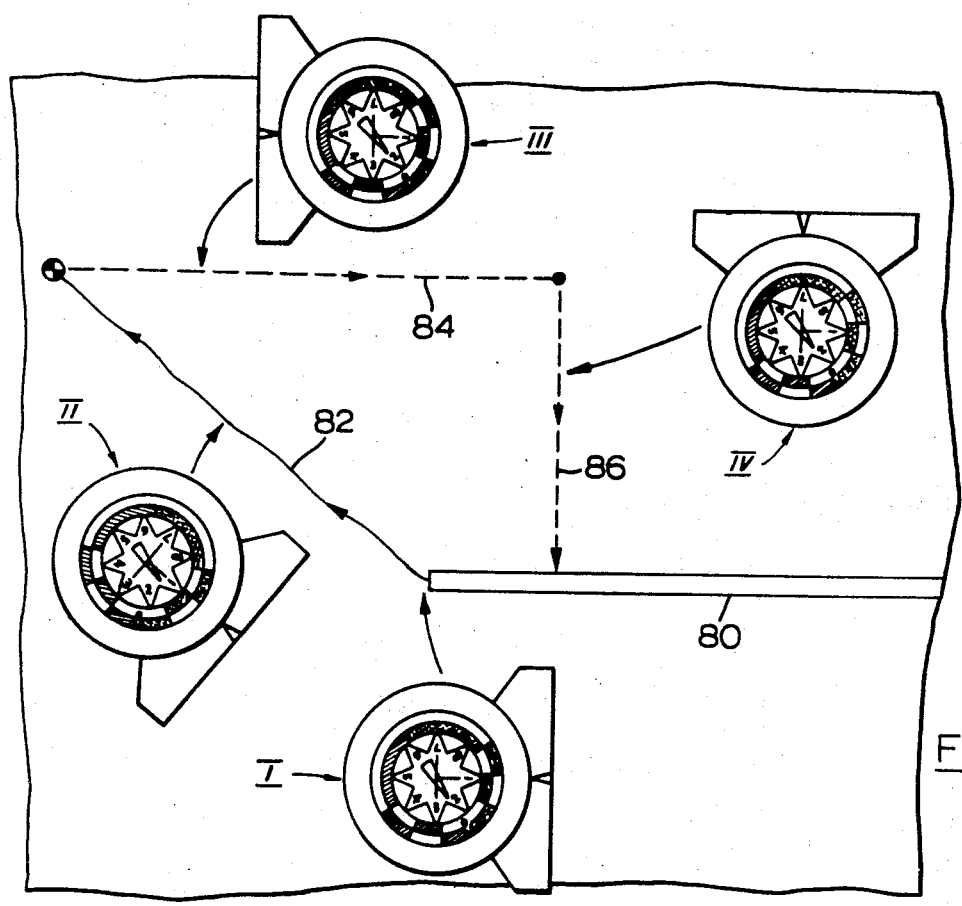
FIG. 5 is a schematic diagram showing a further use of the directional device of FIG. 1.

The device shown in FIGS. 1 and 2 of the drawings comprises a horizontally positioned bowl 12 mounted on a frame 14 which has a vertical back 16 with a slot 18 through which a belt 20 is threaded. Frame 14 also has a lower horizontal flange 22 carrying a threaded clamping screw 24 which lies in the vertical axis of bowl 12 and releasably engages the bottom of the bowl. Upper rim 26 of bowl 12 hooks underneath an overhanging lip 28 located at the top of back 16 on base 14 and the upper rim of the bowl is freely slidable laterally under the lip. A supporting ring 30 is pivotably mounted, on its transverse axis, in the upper portion of bowl 12 by a pair of opposed pins 32 freely rotatable axially in the bowl. A semi-spherical carrier 34 is pivotably mounted within supporting ring 30 by a pair of opposed pins 36 freely rotatable axially in the ring. A transparent casing 38 with an overhanging circumferential rim 39 is fixed on carrier 34 to form a chamber 40. A freely rotatable magnetic compass needle 42 is pivotably mounted in chamber 40 on a vertical pin 44 fixed on carrier 34. The top horizontal face of casing 38 carries a circular dial 46 circumferentially graduated with an eight-pointed star having the points of the star numbered from 1 to 8, and the face of the casing also carries a centrally disposed T 48 having its stem pointing to star point No. 1 of the circular dial. A ring dial 50 circumscribes casing 38 and is mounted for free rotation on carrier 34. Ring dial 50 rests on carrier 34 and has a circumferential shoulder 52 which underlies lip 39 of casing 38. Ring dial 50 is threaded to receive a concentric clamping ring 54 having a knurled portion 55 projecting outwardly from the ring. Ring dial 50 is marked with an angle scale 56 through two half circles from 0 to 18. Two sets of arcs 58 and 59, each set respectively of a different colour, are also inscribed in half circles on the ring dial 50. For example, arc 58 may be yellow and arc 59 may be blue, with the arcs of each set off-set one from another, say in three sectors of 30° and one sector of 90°, to facilitate the reading of ring dial 50.

A pair of laterally spaced cylindrical dials 60a and 60b are rotably mounted in the upper portion of back 16 of frame 14 and each cylindrical dial carries an exposed knurled disc 62. A pair of apertures 64 in the top surface of back 16 give a view of each of dials 60a and 60b which are marked with indicia as shown in charts 66 and 68 in FIG. 4 of the drawings. Chart 66 may for example be carried by cylindrical dial 60a and is used when a person strikes off laterally from a continuous road. The indicia on chart 66 are in two lines each having a block 70 coloured yellow or blue, a pair of numerals 72, and an arrow 74, all as shown in the drawings. Chart 68, carried by dial 60b, is for use when a person strikes off from a dead end road. The indicia on chart 68 consists of four lines each having a pair of numerals 72 and an arrow 74, and also having a T symbol 76, coloured yellow or blue and oriented, all as shown in the drawings.

A reference arrow 78 is notched into the top of back 16 between dials 60a and 60b.

In the operation of the illustrated embodiment, and with particular reference to FIG. 3, a person attaches base 14, with bowl 12 mounted on it, to his body by buckling belt 20 around his waist with the device positioned against his stomach enabling him to look down at dials 46, 50 and 60a, 60b. The person then faces in a direction perpendicular to road 80 and towards that side of the road where he wishes to travel, as seen in FIG. 3 of the drawings. Bowl 14 is turned to position the crossbar of T 48 on circular dial 46 parallel to road 80 and the stem of the T towards the user, which locates point 1 on the star of dial 46 in registration with reference arrow 78, and the bowl is clamped by clamping screw 24. Ring dial 50 is then turned until 0 on the dial registers with compass needle 42 and the ring dial is clamped by screw 54. This initial position and setting of the device is denoted by I in FIG. 3. The person then turns in the direction in which he wishes to travel, noting the colour of the arc 58 or 59 in which compass needle 42 points. For example if compass needle 42 initially points to star point No. 8 as shown in FIG. 3 and if the person turns right and strikes off into the bush at an angle of 60° to the road (i.e. he turns 30° to the right) then needle 42 will point towards yellow arc 58 of ring dial 50 and the person must remember to travel always with needle 42 pointing to the specific numeral in the yellow arc. This position of the device is denoted by II in FIG. 3. If the person wishes to strike off in another direction during his outward journey he must return again as near as possible to his strike-off point.

At the end of his outward travedl along path 82 when the person wishes to return to his vehicle he turns either dial 60a (chart 66) or 60b (chart 68) until either yellow or blue appears, corresponding to the colour he was required to remember when originally leaving the road and striking out across country. Dial 60a is chosen if the person has started out from a continuous road whereas dial 60b is chosen if the person has struck out from the dead end of a road. Where dial 60b (chart 68) is chosen the person takes the additional step, besides choosing the colour yellow or blue, of choosing the particular symbol 76 which corresponds to the position of the road as he left it, for example if he has struck off in a direction which was an imaginary extension of the roadway (within arc A seen in FIG. 3) he would choose an upright T whereas if he has struck off at an angle greater than 90° to the right of the roadway (looking towards its dead end) he would choose the upper reclining "⊢" (choosing the upper reclining symbol if he has struck off to the right of the roadway). Unclamping bowl 12 by screw 24, the person then turns the bowl until a point on the star of circular dial 46, corresponding to the first of numerals 72 showing on the selected cylindrical dial 60a or 60b (chart 66 or 68), registers with reference arrow 78. This also rotates ring dial 50 which is clamped on carrier 34. This position and setting of the device is denoted by III in FIG. 3. Bowl 12 is then reclamped by screw 42 and the person walks in a direction 84 which holds compass needle 42 at 0 on ring dial 50. After walking in this return direction 84 for approximately the time of his outward travel from his automobile, he then stops and turns bowl 12 until a second point on the star of circular dial 46, corresponding to the second of numerals 72 on cylindrical dial 60a or 60b, registers with reference arrow 78, as denoted by IV in FIG. 3, whereupon he continues walking in direction 86 with compass needle 42 registering with 0 on ring dial 50 until he strikes the roadway. Having reached the roadway, directional arrow 74 on dial 60a or 60b indicates in which direction to turn along the roadway in order to reach his starting point and his vehicle.

To sum up, the traveller carries out the following sequence of steps in his overland journey:

1. stand facing at 90° to the roadway, set circular dial 46 to register star point No. 1 with reference arrow 78, and set ring dial 50 to have 0 register with compass needle 42;
2. when starting the outward journey, note the particular arc 58 or 59 to which needle 42 points and keep the compass pointing to that arc during the outward journey;
3. when commencing the return journey, consult cylindrical dial 60a or 60b, in accordance with the type of road where the journey originated (continuous or dead end) and the colour of the arc 58 or 59 to which needle 42 pointed during the outward journey, and reset circular dial 46 to register, with reference arrow 78, the first star point number indicated by dial 60a or 60b;
4. on the return journey keep compass needle 42 in registration with reference 0 on ring dial 50;
5. at a distance along the return journey about equal to the outward journey (i.e. the estimated time of outward travel) reset circular dial 46 to register, with reference arrow 78, the second star point read from cylindrical dial 60a or 60b;
6. in reaching the roadway, follow the directional arrow indicator on cylindrical dial 60a or 60b.

It will be appreciated that, after setting ring dial 50 to have 0 register with compass needle 42, the needle will point in blue arc 59 if he turns left to start his overland journey and it will point in yellow arc 58 if he turns right to start his journey. Numerals 72 are chosen to ensure that on his return journey he bears obliquely to his outward path on that side which will cause him to intersect the roadway. Thus, by turning bowl 12 to star point No. 5 and turning his body to register compass needle 42 with 0 on ring dial 50, the person will face directly towards the roadway. Thereafter by altering his position by one star point he will turn 45° towards his original outward path. For the use of the device as described, detailed graduations on dials 46 and 50 are not necessary; only the equally spaced indicia (the star) on dial 46 and the 180° sets of arcs 58, 59 on dial 50 (together with indicia marking one of the junctions of the sets of arcs) are required, as seen in FIG. 3.

With reference to chart 68 in FIG. 4 of the drawings, the upright T designations are used when striking off from a dead end road 80 in any direction within arc A as seen in FIG. 3, for instance as seen in FIG. 5, and the same steps (1) to (6) are carried out as outlined above, where the person stands as in FIG. 5, facing the end of the road and looking along an extension of its centre line, the indicium T (second indicium 76 from the top) on chart 68 in FIG. 4 is chosen on dial 60b.

Figure 6:
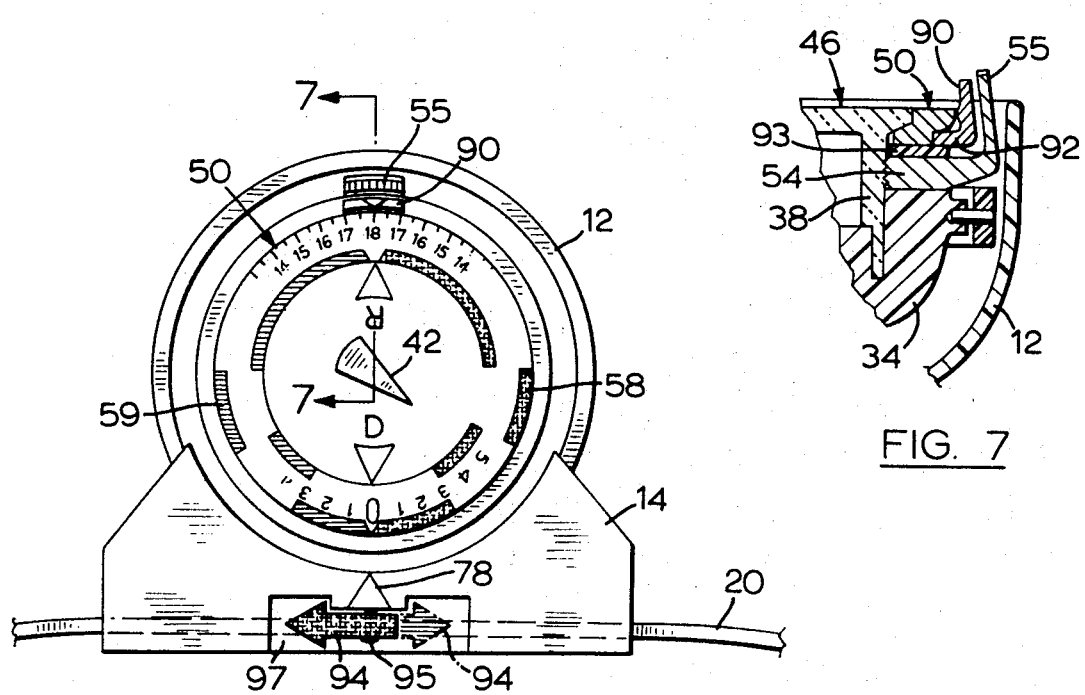
FIG. 6 is a plan view of an alternate embodiment of the device.
Figure 7:
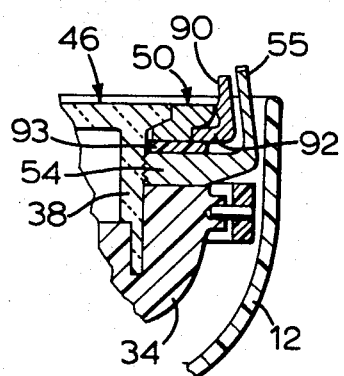
FIG. 7 is a cross-sectional view taken along line 7—7 of FIG. 6.
Figure 8:
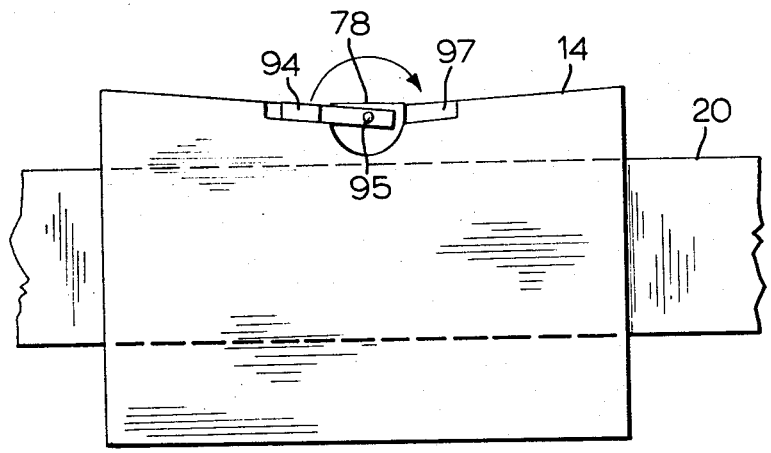
FIG. 8 is a view in elevation showing a side view of the directional indicator portion of the device of FIG. 6.

In the alternate embodiment of the invention shown in FIGS. 6, 7 and 8, the star and graduated indicia are omitted from circular dial 46 which carries instead a pair of diametrically opposed arrows D and R. An upstanding leg marked with further index means forming a memory indicator 90, is carried on a ring 92 and may be pivoted manually around ring 50 against the action of a fraction disc 93 which also bears against clamping ring 54 threaded on casing 38. Dials 60a and 60b of the previous embodiment are replaced by a single directional arrow 94 which is pivoted on a pin 95 in a recess 97 on frame 14 for movement into one of two positions, the opposed surfaces of the directional arrow being coloured yellow and blue respectively. Arrow 94 is pivotable to point in either of two opposed directions laterally on frame 14; when pointing away from yellow arcs 58 on ring dial 50 the yellow face of arrow 94 is presented as seen in solid lines in FIG. 9, and when pointing away from red arcs 59 on ring dial 50 the red face of arrow 94 is presented as seen in broken lines in FIG. 9.

Figure 9:
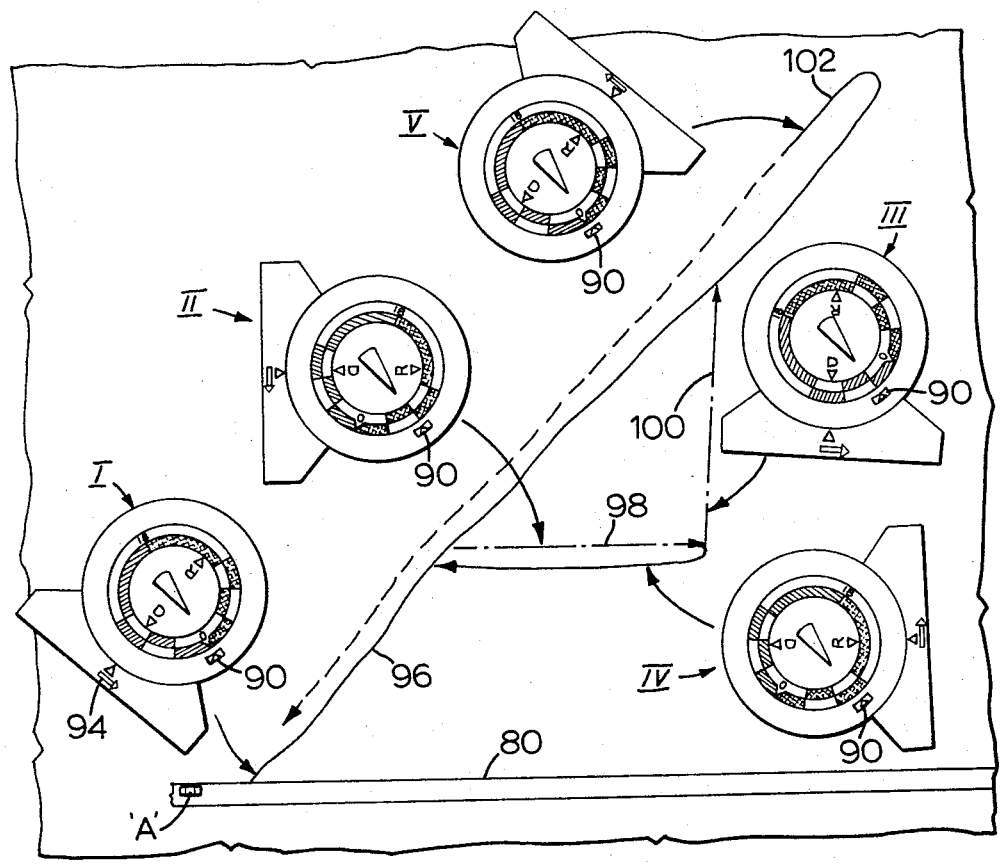
FIG. 9 is a schematic diagram showing the use of the directional device of FIG. 6.

In the operation of the embodiment shown in FIGS. 6, 7 and 8, and with reference to FIG. 9, a person leaves road 80 for overland travel, at least 1,000 feet from the dead end of the road if such a dead end exists and at least 1,000 feet from his automobile A. With the device attached to his body, the person rotates bowl 12 to register arrow D with arrow 78 and then, turning in the direction he wishes to travel, rotates ring dial 50 to register 0 with compass needle 42 and clamps the ring dial with clamping ring 54 by knurled portion 55, as denoted by I in FIG. 9. Also, directional arrow 94 is set at this time by the person turning to face his automobile A, noting the colour sector 58 or 59 towards which needle 42 points, and flipping the directional arrow to the corresponding colour. The traveller then turns memory indicator 90 into line with 0 on ring dial 50 and walks in the chosen direction along a path 96, keeping needle 42 registering with 0 on the ring dial.

When the person wishes to deviate temporarily from path 96 in a new direction he turns in that direction and turns the memory indicator 90 to have it facing needle 42, notes the numeral in arc 58 or 59 to which needle 42 points, and travels along new path 98, keeping the compass needle pointing to memory indicator 90, as denoted by II in FIG. 9. To return to path 96 the person turns memory indicator 90 to the numeral in the other arc 58 or 59 which is the same as the noted numeral, and then travels along a path 100 keeping the needle pointed to memory indicator 90, as indicated by III in FIG. 9. When the person has travelled along path 100 a distance approximately equal to the distance along path 98 he again sets memory indicator 90 to 0 in dial 50, turns to have needle 42 point to memory indicator 90, and continues his outward journey along path 96.

alternatively, if the person, after having travelled along deviating path 98, wishes to return to his original point of deviation, he rotates bowl 12 on its axis 180°, that is, with arrow R on dial 46 pointing at arrow 78 and turns to have needle 42 point to memory indicator 90, as indicated by IV in FIG. 9. The person will effectively be returning along path 98 since the bowl has been rotated 180°, and he will reach his point of deviation when he will have walked back approximately the same distance as for his outward deviating journey. To resume his outward journey he then rotates bowl 12 again 180° to have arrow D pointing to arrow 78 and moves memory indicator 90 to register again with 0 on ring dial 50.

To return to his automobile after completing his outward journey, the traveller rotates and clamps bowl 12 with arrow R on dial 46 pointing towards arrow 78 on frame 14, as indicated by V in FIG. 9, and walks back along path 102 with needle 42 pointing towards memory indicator 90 which is set facing 0 on dial 50. To deviate temporarily from path 102, the person follows the same steps as outlined above for deviating from outward path 96. When road 80 is reached, the person turns in the direction of arrow 94 to reach his automobile.

To sum up, the traveller would carry out the following sequence of steps using the embodiment of FIGS. 7 to 9 in his overland journey:

1. move away at least 1,000 feet from the automobile and from a dead end if such exists;
2. stand facing in the direction of intended outward travel, clamp bowl 12 by screw 24 with arrow D on dial 46 facing arrow 78 on frame 14, turn ring dial 50 until 0 registers with free floating compass needle 42 and then clamp dial ring 50 by moving knurled portion 55 of clamp 54, set memory indicator 90 at 0, face in the direction of the automobile, and set directional arrow 94 to the colour yellow or blue corresponding to colour sector 58 or 59 towards which needle 42 is pointing;
3. proceed in the outward direction along path 96, keeping needle 42 in registration with 0 on ring dial 50;
4. to deviate temporarily from path 96, turn into the new direction, set memory indicator 90 to face needle 42, and proceed along deviating path 98 keeping needle 42 registering with memory indicator 90;
5. to return to path 96, turn memory indicator 90 to register with the same numeral in the other arc 59 or 58 of dial 50 as the numeral to which the memory indicator pointed at the outward direction and proceed along path 100, with needle 42 registering with the memory, a distance approximately the same as that of path 98, then turn again until needle 42 points to 0 on ring dial 50, and set memory indicator at 0. Alternatively, to return to the point of deviation rotate bowl 12 180° so that arrow R registers with arrow 78 and walk back with needle 42 registering with memory indicator 90 for approximately the same distance as the outward deviation;
6. to return to the original starting point, turn bowl 12 180° to have arrow R register with arrow 78, clamp bowl 12, and then travel along path 102, keeping needle 42 in registration with direction indicator 90 set at 0. On reaching road 80, turn as indicated by directional arrow 94 to reach the automobile.

I claim:

1. A directional device for use in overland travel, comprising:
    a frame:
    a pair of concentric planar circular dials each mounted on said frame for rotation relative to said frame and to each other about their common axis;
    one of said dials having at least one first reference indicium;
    the other of said dials being divided about its circumference into two individually distinguishable semicircular arcs with a second reference indicium marking at least one of the two junctions between said arcs;
    means for releasably clamping the pair of dials together for mutual rotation about their common axis relative to the frame;
    means for releasably securing said one dial on the frame against rotation relative thereto;
    index means on the frame with which the first reference indicium on said one dial may be registered on rotation of said one dial;
    a magnetic compass needle mounted for free pivotal movement about said common axis relative to the other dial being registrable with the needle on rotation with respect to said other dial of said other dial; and
    memory indicator means having further index means thereon, said indicator means being mounted on said frame adjacent said other dial and rotatable concentrically therewith, and means to inhibit the indicator means against free rotation.

2. A device as claimed in claim 1 in which said one dial is graduated equally about its circumference to identify eight different reference indicia spaced apart 45°.

3. A device as claimed in claim 1 in which said one dial is a disk dial and said other dial is a dial ring circumscribing said one dial.

4. A device as claimed in claim 3 including means engagable with the frame for attachment of the frame to a person's body.

5. A device as claimed in claim 4 in which the means engaging the frame comprises a belt threaded through the frame.

6. A device as claimed in claim 3 wherein said memory indicator means, comprises a ring mounted on said frame concentrically with said dials, an upstanding leg carried by said ring, said leg being located adjacent with said other dial and having further index means thereon, said ring being manually adjustable to move said leg concentrically in relation to said other dial, and braking means to inhibit the movement of said ring.

7. A device as claimed in claim 3 including means to carry said dials, said carrying means being mounted on the frame and releasably secured thereon for rotation about said common axis, the magnetic compass needle being mounted for free pivotal movement on the carrying means, said one dial being fixed against rotation relative to the carrying means.

8. A device as claimed in claim 7 in which the carrying means comprises a bowl rotatable about its vertical axis relative to the frame, the dials being nested in the bowl and mounted co-axially thereon.

9. A device as claimed in claim 8 in which said one dial has a pair of diametrically opposed first reference indicia.

10. A device as claimed in claim 1 including means mounted for pivotal movement relative to the frame for indicating lateral directional orientation.

11. A device as claimed in claim 10 in which the directional means comprises an arrow pivotable tp point in either of two opposed lateral directions with respect to the frame and to present either of two individually distinguishable colours, the arcs on said other dial being also individually distinguishable by said two colours, the arrow when presenting one of said colours pointing in a direction away from that said colour on said other dial when the second indicium on said other dial is registered with said index means.

12. A device as claimed in claim 1 in which the two semi-circular arcs are each divided uniformly into a plurality of graduating indicia, the arcs being mirror images one with the other.

* * * * *

UNITED STATES PATENT OFFICE
CERTIFICATE OF CORRECTION

Patent No. 3,871,108                    Dated March 18, 1975.

Inventor(s)    Henri Beaudout.

It is certified that error appears in the above-identified patent and that said Letters Patent are hereby corrected as shown below:

Claim 1, line 23, after "the" insert -- frame and the dials, the second reference indicium on said --;

Claim 1, line 25, cancel "with respect to said other dials";

Claim 1, line 29 cancel "frame adjacent said";

Claim 1, line 31, after "rotation" insert -- with respect to said other dial --;

Claim 3, line 2, cancel "disk";

Claim 3, line 2, after "dial" insert -- disk --.

Signed and Sealed this tenth Day of February 1976

[SEAL]

Attest:

RUTH C. MASON
*Attesting Officer*

C. MARSHALL DANN
*Commissioner of Patents and Trademarks*